UNITED STATES PATENT OFFICE.

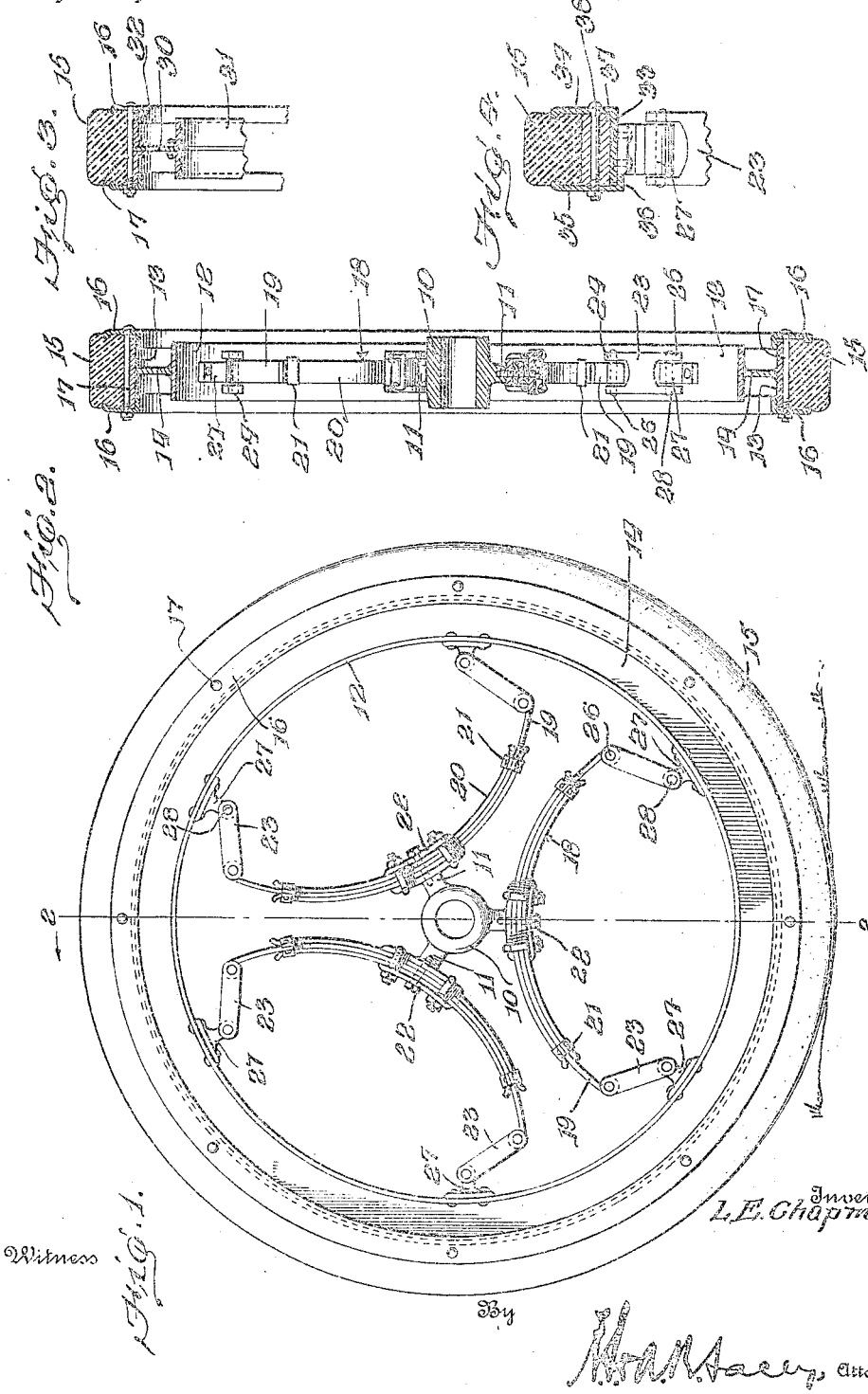

LOREN E. CHAPMAN, OF SYRACUSE, NEW YORK.

SPRING-WHEEL.

1,281,911.  Specification of Letters Patent.  Patented Oct. 15, 1918.

Application filed May 6, 1916. Serial No. 95,930.

*To all whom it may concern:*

Be it known that I, LOREN E. CHAPMAN, a citizen of the United States, residing at Syracuse, in the county of Onondaga and State of New York, have invented certain new and useful Improvements in Spring-Wheels, of which the following is a specification.

This invention contemplates an improved resilient wheel and has as its primary object to provide a construction wherein the wheel hub will be cushioned for eccentric movement with equal resiliency in all directions.

The invention has as a further object to provide a wheel employing a plurality of cushioning springs for the hub and wherein the said springs will be swingingly mounted to thus yieldably support the hub for eccentric movement in all directions.

And a still further object of the invention is to provide a wheel which will be adapted for use upon motor vehicles or other conveyances and which will eliminate the use of the commonly employed pneumatic tire.

Other and incidental objects will appear as the description proceeds and in the drawings wherein I have illustrated the preferred embodiment of the invention and wherein similar reference characters designate corresponding parts throughout the several views, Figure 1 is a side elevation of my improved wheel showing the arrangement of the cushioning springs therein, Fig. 2 is a section on the line 2—2 of Fig. 1 and more particularly showing the mounting of the said springs as well as the construction of the tire receiving felly of the wheel, Fig. 3 is a fragmentary sectional view of a slightly modified form of felly, and Fig. 4 is a similar view of a still further modified form of felly.

In carrying out the invention, my improved wheel is formed with a hub 10 which may be of any suitable type to receive the vehicle axle and is provided with a plurality of circumferentially spaced radial arms 11 terminating in laterally enlarged heads. Surrounding the hub 10 is a felly which includes an inner annular band 12 and a concentrically arranged outer annular band 13. These bands may be formed of metal or any other suitable material and are connected by a radial web 14 secured in any approved manner at its inner and outer edges respectively to the said bands. The band 13 is preferably wider than the band 12 and mounted thereon, is an annular tread 15 which may be formed of rubber or any other suitable material. Connecting the tread with the felly are coacting clamping rings 16 engaging opposite sides of the tread and formed at their inner edges with flanges to embrace the side edges of the band 13. Connecting the clamping rings 16, are a plurality of circumferentially spaced bolts or other suitable fastening devices 17 adjustable for urging the rings 16 to active position to engage with the tread 15.

Supporting the hub 10 relative to the felly, are a plurality of cushioning springs 18 each of which includes a master leaf 19 upon opposite sides of which are arranged shorter supplemental leaves 20 detachably connected at their extremities to the master leaf by clips 21. The springs 18 are bowed inwardly toward the hub 10 and are detachably connected to the arms 11 thereof by suitable clips 22 embracing the extremities of the heads of the said arms and respectively engaging each of the springs at points substantially midway the ends thereof with radial bolts extending through the spring leaves and into the said arms for holding the said leaves against relative longitudinal movement.

Swingingly connecting each of the springs 18 with the felly is a pair of links 23. These links, at their inner and outer extremities, are provided with spaced lugs or arms 24 and 25 respectively and the master leaves 19 are, at their outer extremities, received between the lugs 24 of the said links to be rolled about suitable pivot pins 26 extending between the lugs 24 and pivotally connecting the springs with the links. At their outer ends, the links 23 are swingingly supported by inwardly directed brackets 27 connected to the inner face of the band 12 of the felly with the arms 25 of the links embracing the brackets and pivotally connected thereto by suitable pivot pins 28.

It will be observed that the springs 18 are each swingingly supported at their ends upon the felly and the said springs will thus cushion the hub 10 for eccentric movement with equal resiliency in all directions. At the same time, the links 23 will coact with the brackets 27 and with the ends of the springs 19 to hold the hub against lateral displacement. Consequently, I provide a very simple and efficient construction of spring wheel which will yieldably support and cushion the load and is thus adapted for use upon motor vehicles or other conveyances. Furthermore, the construction is such that the use of the commonly employed pneumatic tire is eliminated.

In Fig. 3 of the drawings, I have illustrated a slightly modified construction of felly for the wheel. In this modification, a radial annular web 30 is employed to opposite sides of the inner margin of which are connected laterally directed annular rings 31 which form an inner band corresponding to the band 12 of the preferred form of the invention. Connected to opposite sides of the outer margin of the web 30 are laterally directed annular rings 32 which form a band corresponding to the band 13 of the preferred form of the invention, this band 32 receiving the tire 15 which is connected to the said band by the rings 16 and bolts 17. It will be seen that this modified form of felly may be easily constructed and will provide a very desirable arrangement.

In Fig. 4 of the drawings, I have illustrated a still further modified form of felly for the wheel. In this modification, an annular band 33 is employed from one margin of which projects a radially extending annular flange or ring 34. Coöperating with the flange 34 is an annular clamping ring 35 which, at its inner margin, is formed with a laterally directed annular flange 36 embracing the free edge of the band 33. Seated on the band 33 between the flanges 34 and ring 35 is an annular filler ring 37 which may be formed of wood or any other suitable material and surrounding the said member is the tire 15 which is engaged at opposite sides by the flange 34 and ring 35. Connecting the ring with the flange, are a plurality of circumferentially spaced bolts or other suitable fastening devices 38 which are freely fitted through the ring 37 and are adjustable to clamp the tire 15 between the said ring and flange. It will be noted that when this form of the invention is employed, the brackets 27 are secured directly to the band 33. This modified form of felly will provide a very light structure particularly adapted for use upon motorcycle wheels or the wheels of light motor vehicles while at the same time, the construction of the felly is such as to provide a thoroughly efficient and durable arrangement.

Having thus described my invention what I claim and desire to secure by Letters Patent is:

A wheel including a felly and a hub provided with radially extending arms terminating in elongated heads, a plurality of outwardly bowed springs arranged in substantially triangular form around the hub and each including a main leaf and supplemental leaves of less length than the main leaf, the opposite ends of the main leaves being curved in the direction of the felly, clips engaging the main and supplemental leaves of each spring and extending around the heads of the adjacent arms, brackets rigidly secured to the inner face of the felly, and links forming a pivotal connection between the brackets and the curved ends of the main leaf of each spring, the links of each spring converging in the direction of the felly.

In testimony whereof I affix my signature.

LOREN E. CHAPMAN. [L. S.]

Copies of this patent may be obtained for five cents each, by addressing the "Commissioner of Patents, Washington, D. C."